E. E. NOVOTNY.
PRINTING PLATE.
APPLICATION FILED AUG. 6, 1918.
1,377,514.
Patented May 10, 1921.
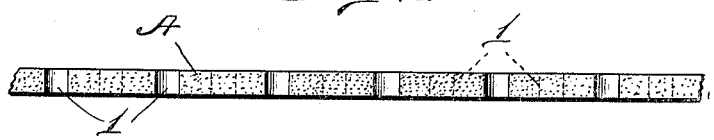
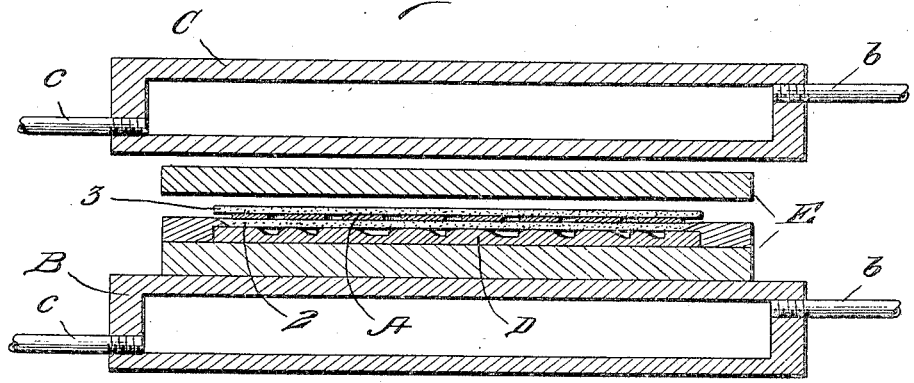
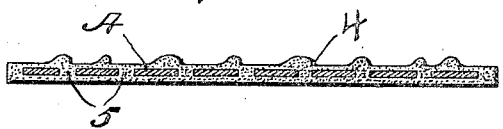

UNITED STATES PATENT OFFICE.

EMIL E. NOVOTNY, OF PHILADELPHIA, PENNSYLVANIA, ASSIGNOR TO J. STOGDELL STOKES, OF MOORESTOWN, NEW JERSEY.

PRINTING-PLATE.

1,377,514. Specification of Letters Patent. Patented May 10, 1921.

Application filed August 6, 1918. Serial No. 248,647.

*To all whom it may concern:*

Be it known that I, EMIL E. NOVOTNY, a citizen of the United States, residing at Philadelphia, in the county of Philadelphia and State of Pennsylvania, have invented new and useful Improvements in Printing-Plates, of which the following is a specification.

This invention relates to molded printing plates.

Heretofore I have made printing plates composed wholly or partially of a plastic material which will harden and set under heat and pressure, employing a substance commonly known as bakelite or condensite. In some instances, as in making a composite plate, I have employed these phenolic condensation products in conjunction with fibrous material, which I have used both as a backing and a filler. I have found, however, that where any great amount of phenolic condensation product has been employed, there has been a tendency of the material when in its plastic state to flow laterally under the molding action of the press, and this may sometimes result in the production of imperfect spots on the printing or type surface of the plate, such spotting of this surface being particularly liable to occur where the type faces are relatively deep. Furthermore where a trade-mark or grooves, or a field of half-tone dots, or other depressions are made on the back of the phenolic printing plate, there is a liability of the appearance of depressions at the printing face of the finished plate. I have found that I can obviate these objections by employing a layer of non-flowing fibrous material between the face and back of the plate because there is a tendency toward a straight compression under the application of pressure in the making of the plate, this of course obviating the lateral flow of the material as above mentioned, or at least reducing such lateral flow to a minimum so that sharper casts of deeper type may be made than when the plate is composed entirely of a solid body of phenolic material. I have also found it advantageous to impregnate this intermediate layer of fibrous material with a liquid phenolic condensation product in order to give the requisite strength and stability to the finished plate, for the purpose of causing the intimate union between the various layers making up this composite phenolic and fibrous plate and also to increase the strain resisting power of the latter. I have found it advantageous to perforate the intermediate or fibrous layer in order that the phenolic material constituting the back and front of the plate may flow through these openings in the form of short studs, thus securely locking the various sections or layers of the plate together.

In the accompanying drawings:

Figure 1 is a cross sectional view taken through the fiber board layer forming a part of my improved printing plate.

Fig. 2 is a cross sectional view taken through two conventionally illustrated press platens showing a step in the molding of my improved printing plate.

Fig. 3 is a cross sectional view taken through a completely molded printing plate.

Referring now to the accompanying drawings in detail: Letter A indicates as an entirety a sheet or layer of material which is to constitute the intermediate layer of my printing plate. This sheet is preferably composed of fibrous material possessing a certain amount of flexibility such as chip board, straw board, paper, felt or the like and is provided with a series of perforations such as are shown at 1, these perforations being spaced suitable distances apart. I preferably impregnate this fibrous sheet A with a suitable material, such as Chinese wood oil, high temperature cylinder oil, or a phenolic varnish, thus causing the fibers of the board to swell and open, thereby giving the material greater flexibility and compressibility. In actual practice I prefer to use a mixture of high flash point cylinder oil saturated into the fiber after the latter has been partially impregnated with a liquid phenolic condensation product such as a phenolic varnish, this being for the purpose of obtaining a shrinkage coefficient of about the same degree or character as the shrinkage coefficient of the phenolic material of which the face and back of the plate is to be made.

In the manufacture of my plate I may resort to the use of any suitable press and in Fig. 2 have shown the bottom platen B and the upper platen C of a conventional form of press, these platens being hollow and provided with steam inlets *b* and steam outlets *c*. Upon the bottom platen of the press I place a suitable matrix D preferably one provided with a metallic molding face, the matrix being supported in the casting box of any suitable form indicated as an entirety by the letter E. Upon the molding face of this matrix I place a sheet 2 of unset phenolic condensation product, such as a sheet of commercial bakelite, condensite or similar synthetic resin, this sheet subsequently forming the printing face of the plate. Upon the sheet 2 I then impose a perforated fiber sheet A, and then place upon the fiber sheet A a second sheet of a phenolic condensation product such as above mentioned, which second sheet is indicated by the numeral 3. The casting box is then closed and the platens are brought together to apply heat and pressure for a suitable period, such for instance as about from one to ten minutes, and under the action of the heat and pressure the type characters in the molding face of the matrix will be reproduced in the contacting face of the sheet 2 to produce the printing face 4 of the printing plate. At the same time the back of the sheet or layer 3 of the phenolic condensation product will be brought perfectly level or flat by the upper section of the casting box and the now softened and readily flowing material of both phenolic sheets or layers 2 and 3 will be forced through the openings 1 in the fiber plate A this forming short locking studs 5, which unite the two phenolic layers of the plate to each other as an integral structure and also unite these plates to the intermediate fiber layer or sheet A as will be clearly understood by reference to Fig. 3. At the same time the material of the phenolic layers or sheets in contact with the adjacent imperforated parts of the fiber layer will cement or adhere to such imperforated sections and unite, to some degree with the phenolic material with which this fiber layer of sheet is impregnated thereby further strengthening the plate and increasing its stability and wearing qualities.

This manner of producing printing plates of this character enables me to obtain sharper casts, more uniformity in casting results while using a cheaper substitute, such as a fiber body for the non-wearing or intermediate portions of the plate, thus resulting in greater economy in the manufacture of plates of this description.

Furthermore in this plate I eliminate the brittle tendency of the hard all phenolic plate and also avoid the danger of the plates being loosened from the press clamps or cracking when fastening or mounting upon the base block.

What I claim is:

1. A printing plate comprising a facing layer of hard cementitious material having printing characters thereon, a backing layer also of hard cementitious material and an intermediate sheet of compressible material having openings therein for the passage of portions of the material of the facing and backing layers, whereby said layers will be firmly united to each other and to the intermediate sheet.

2. A printing plate comprising a facing layer of hard and set synthetic resinous material having printing characters thereon, a backing layer also of hard and set synthetic resinous material, and an intermediate layer of compressible fibrous material having openings therein for the passage of portions of the material of the facing and backing layers, whereby all of the layers of the plate are intimately and firmly united.

3. A printing plate comprising a facing layer of a hard and set phenolic condensation product having printing characters thereon, a backing layer also of a hard and set phenolic condensation product, and an intermediate layer of compressible fiber impregnated with a phenolic condensation product and having openings therein, through which some of the material of the facing and backing layers extends, whereby said facing and backing layers are intimately united to each other and to the intermediate layer.

4. A printing plate comprising a facing layer of phenolic condensation product having printing characters on one face thereof, a backing layer also composed of a phenolic condensation product, and an intermediate layer of compressible fiber board impregnated with a phenolic condensation product and an oily substance, said intermediate layer having openings therein for the passage of some of the material of the facing and backing layers, whereby said facing and backing layers are intimately united to the intermediate layer and to each other.

In testimony whereof I have hereunto set my hand.

EMIL E. NOVOTNY.